United States Patent [19]

Hausinger

[11] Patent Number: 4,534,746
[45] Date of Patent: Aug. 13, 1985

[54] COUPLING FOR THE DETACHABLE CONNECTION OF A SUBDIVIDED DRIVE SHAFT OF A MOTOR VEHICLE

[75] Inventor: Otto Hausinger, Gerlingen, Fed. Rep. of Germany

[73] Assignee: Dr. Ing. h.c.F. Porsche A.G., Fed. Rep. of Germany

[21] Appl. No.: 416,000

[22] Filed: Sep. 8, 1982

[30] Foreign Application Priority Data

Sep. 9, 1981 [DE] Fed. Rep. of Germany ....... 3135689

[51] Int. Cl.³ .......................... B60K 17/22; F16D 1/00
[52] U.S. Cl. ...................................... 464/170; 74/700; 403/312; 403/344; 464/182
[58] Field of Search ............... 464/170, 178, 177, 153, 464/182; 403/310, 312, 344, 113, 311; 74/607, 700, 713; 180/70.1, 75.2, 85, 88

[56] References Cited

U.S. PATENT DOCUMENTS

| 513,609 | 1/1894 | Crolley | 403/310 |
| 700,457 | 5/1902 | Tower | 403/310 |
| 772,578 | 10/1904 | Palmer | 403/310 |
| 1,337,642 | 4/1920 | Clark | 403/311 |
| 1,559,546 | 11/1925 | Bosket | 403/312 |
| 1,596,480 | 8/1926 | Cosgrove et al. | 464/182 X |
| 2,904,974 | 9/1959 | Libby | 464/170 X |
| 2,943,876 | 7/1960 | Morris | 403/313 |
| 4,175,405 | 11/1979 | Smith | 464/170 X |

FOREIGN PATENT DOCUMENTS

| 213157 | 1/1961 | Austria | 403/310 |
| 376152 | 1/1923 | Fed. Rep. of Germany | 403/310 |
| 2360514 | 6/1975 | Fed. Rep. of Germany | 180/75.2 |
| 904981 | 9/1962 | United Kingdom | 403/310 |

Primary Examiner—Stuart S. Levy
Assistant Examiner—Daniel P. Stodola
Attorney, Agent, or Firm—Craig and Burns

[57] ABSTRACT

A coupling detachably connecting a subdivided drive shaft of a transaxle system includes at least one ring that holds together two coupling halves. Clearance is provided between each ring and one of the coupling halves to permit release of the coupling and the subdivided shaft portions. The coupling assumes a corresponding position during the assembly.

4 Claims, 6 Drawing Figures

COUPLING FOR THE DETACHABLE CONNECTION OF A SUBDIVIDED DRIVE SHAFT OF A MOTOR VEHICLE

The present invention relates to a coupling for the detachable connection of a subdivided drive shaft of a motor vehicle which is supported in a bearing tube that connects a forwardly disposed drive unit with a rearwardly disposed transmission unit, especially of a transaxle aggregate.

For purposes of connecting a subdivided shaft, couplings are known which include two half-shells connected with each other by means of clamping bolts or clamping screws, which are provided with a toothed arrangement for the transmission of a torque. For the axial securing, apertures are provided in each shaft, into which engage the clamping bolts. With a coupling of such construction, it is necessary for the separation of the shaft to remove the bolts or screws out of the coupling so that no mutual connection exists any longer between the half-shells, and they fall apart. With an assembly location accessible only with difficulty, they are thus removed from the simple and rapid accessibility of the assembly person so that it is possible only with difficulties to connect the shaft again by way of the coupling. This is the case in particular with a subdivided drive shaft of a transaxle aggregate. The shaft sections are connected with each other by way of a coupling which is arranged within the area of the transmission housing neck. It is accessible only by way of a working opening in the support tube by means of a tool so that in addition to an assembly location accessible only with difficulty, unfavorable visibility conditions exist which renders difficult the assembly of the coupling.

It is the principal object of the present invention to provide a coupling for drive shafts of the aforementioned type, by means of which a simple and rapid separation and connection of subdivided drive shafts is possible, especially at assembly locations that are accessible with difficulty.

The underlying problems are solved in accordance with the present invention in that the two half-shells of the coupling are surrounded with play by at least one unitary ring.

The advantages achieved with the present invention reside essentially in that in the disassembled condition with pulled-out bolts or screws, the two half-shells of the coupling are retained in the assembly position by way of the one-piece ring and thus cannot fall apart. The half-shells of the coupling are retained together by the ring in such a condition as enables a rapid disengagement and connection of the shaft at assembly locations accessible only with difficulties since the screws or bolts can be introduced into the approximately aligned bores without an expensive alignment of the half-shells with respect to each other. In particular, with a transaxle aggregate, such a coupling is of advantage in order that, for example, the rearwardly disposed transmission can be separated with its transmission input shaft in a simple manner from the remaining drive shaft which leads to the forwardly disposed internal combustion engine and, respectively, can easily be connected again with the remaining drive shaft.

These and other objects, features and advantages of the present invention will become more apparent from the following description when taken in connection with the accompanying drawing, which shows, for purposes of illustration only, one embodiment in accordance with the present invention, and wherein.

Figure 1:
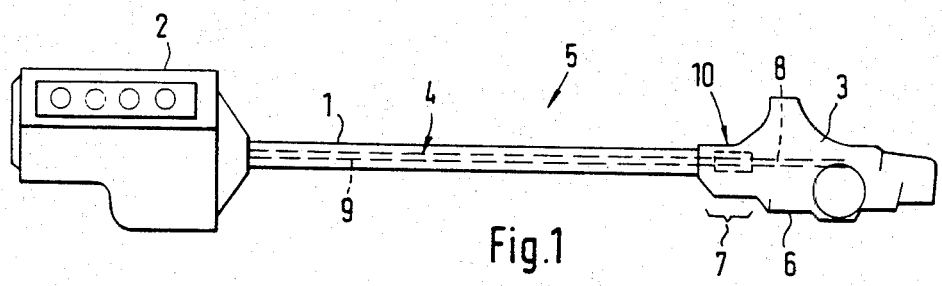
FIG. 1 is a schematic side view of an engine connected to a transaxle aggregate by a subdivided drive shaft, supported in a bearing tube, having a coupling in accordance with the present invention.

Referring now to the drawing wherein like reference numerals are used throughout the various views to designate like parts, and more particularly to FIG. 1, this figure illustrates a drive unit of a motor vehicle in which a support or bearing tube 1 establishes a rigid connection between a forwardly disposed internal combustion engine 2 and a rearwardly disposed transmission unit 3. The transmission unit 3 includes essentially change-speed gears and an axle gear. The internal combustion engine 2 is in driving connection with the rearwardly disposed transmission unit 3 by way of a drive shaft generally designated by reference numeral 4 arranged inside of the support tube 1. This driving unit referred to as transaxle aggregate generally designated by reference numeral 5 is mounted at the vehicle superstructure by way of conventional bearing supports which are not illustrated herein. The drive shaft 4 is arranged within the support tube 1 between conventional bearings (not shown).

The drive shaft 4 is subdivided within the area 7 of the transmission housing 6 into a rear shaft section 8 and a forward shaft section 9. A connection of these two shaft sections 8 and 9 into a continuous drive shaft for transmitting torque takes place by way of a coupling generally designated by reference numeral 10. The coupling 10 includes two half-shells 11 and 12 which are provided with an internally toothed arrangement 13 into which engages a corresponding toothed arrangement 14 of the ends of the shaft sections 8 and 9 to be connected.

For purposes of fixedly securing the half-shells 11 and 12, bolts or screws 17, 18, 19 and 20 are provided in the flanges 15, 15a, 16, 16a located near the ends of the half-shells. The bolts 17, 18, 19 and 20 are so arranged that they engage in recesses 21 and 22 of the two shaft sections 8 and 9 and prevent an axial displacement of the shaft sections 8 and 9 relative to one another.

Figure 4:
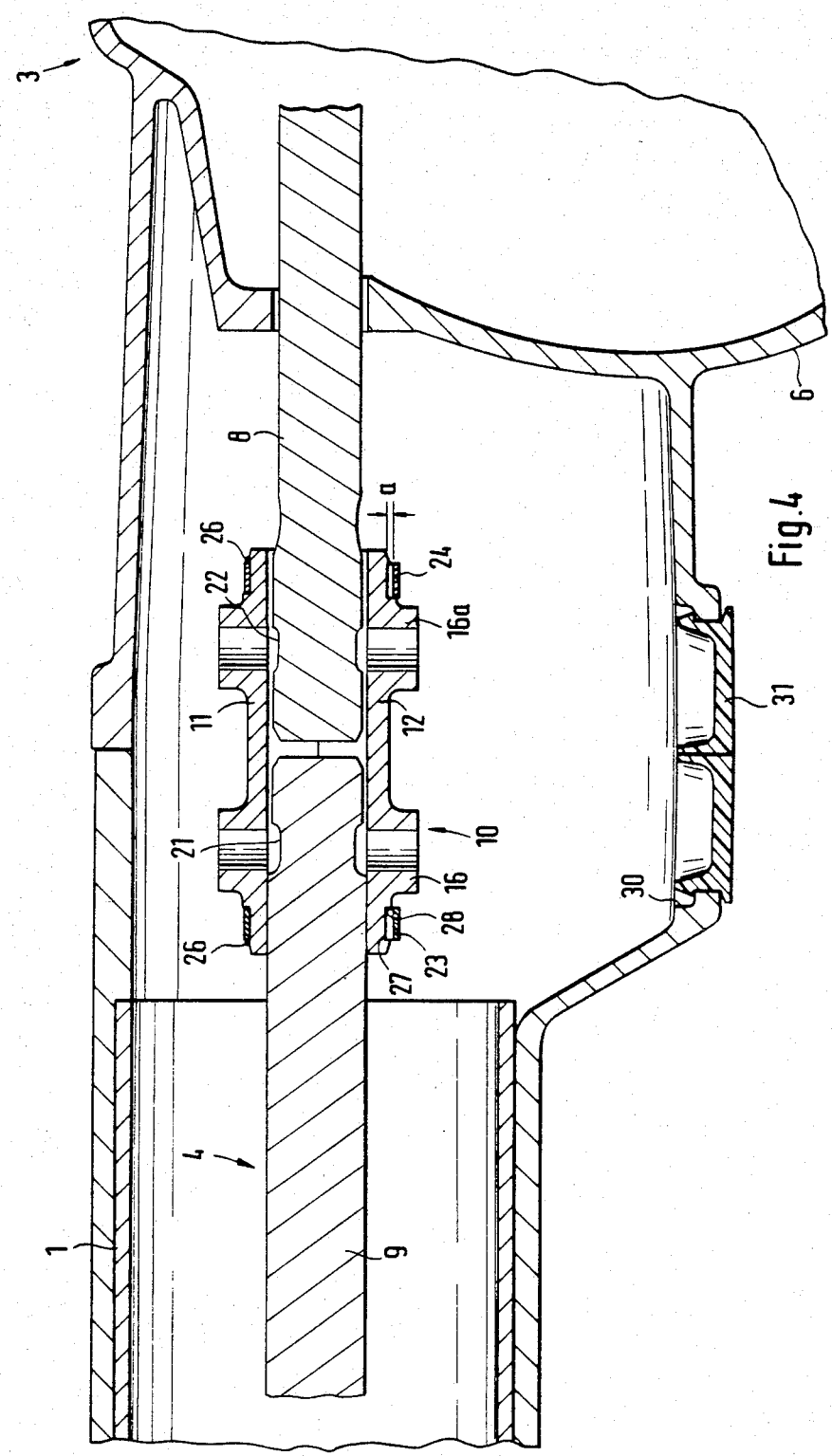
FIG. 4 is a longitudinal cross-sectional view of the coupling in accordance with the present invention which is arranged partially in the support tube and in the transmission housing neck of the transaxle aggregate.

The two free ends 33 and 34 of the coupling 10 are surrounded with a clearance a (FIG. 4), by one-piece or unitary rings 23 and 24. The rings 23 and 24 are arranged in such a manner that one of the half-shells, for example, the half-shell 11 is securely or rigidly connected with the rings 23 and 24 whereby the other half-shell, for example, the half-shell 12 is arranged so as to be moveable and with respect to the rings 23 and 24.

The clearance a between the rings 23, 24 and the half-shell is large enough so that after the removal of the bolts 17, 18, 19 and 20, a clearance will result between the toothed arrangement 13 of the coupling and the toothed arrangement (not shown) of the shafts 8 and 9 so that the shafts 8 and 9 are separable from the coupling and, accordingly, from one another. Such an arrangement facilitates reconnection of shaft 8 to shaft 9 by the simple insertion of the ends of shafts 8 and 9 in respective ends of the coupling and the tightening of the bolts.

The rigid connection of the rings 23 and 24 with one of the half-shells 11 or 12 takes place by welding, for example, by two spot-welding points 25 and 26. However, a bonded connection is also possible within the scope of the present invention.

The rings 23 and 24 are arranged in recesses 27 which include an inner boundary 28 so that a mutual displacement of the half-shells 11 and 12 is not possible.

Figure 5:
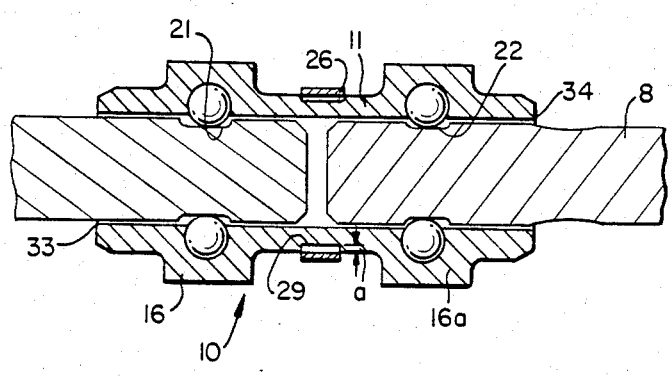
FIG. 5 is a longitudinal cross-sectional view of the coupling in accordance with the present invention.

As shown in FIG. 5, according to a further embodiment of the present invention, it is also possible to provide a single ring which is retained with clearance a between the threaded bolts within a central recess 29.

Figure 2:
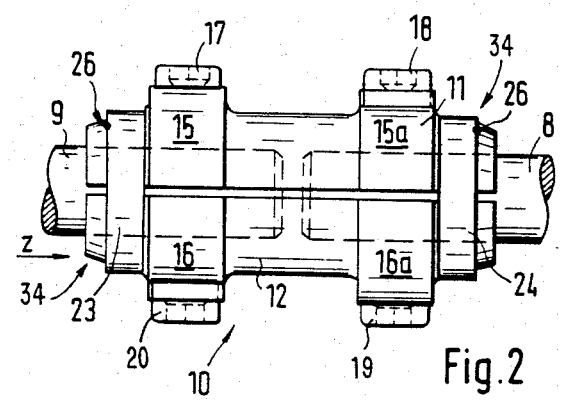
FIG. 2 is a side elevational view of the coupling of the present invention showing the rings for the retention of the half-shells.
Figure 3:
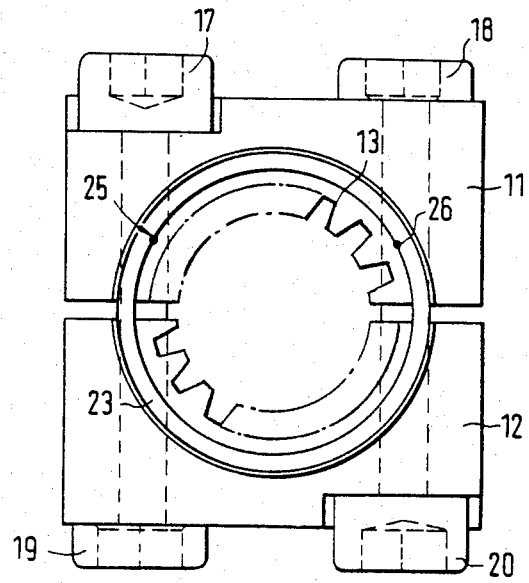
FIG. 3 is an elevational view of the coupling taken in the direction of arrow Z of FIG. 2.

For purposes of separating and connecting the shafts 8 and 9, a tool is introduced through an assembly opening 30, normally covered by removable plug 31, of the transmission housing 6, and the shaft is rotated until the bolts 17, 18, 19 and 20 (FIG. 2) of the coupling 10 have each been engageable by the tool. Depending on the operation, separation or connection, the bolts 17, 18, 19 and 20 are either loosened or tightened. After completion of the separating or connecting operation, the opening 30 is again closed by the plug 31.

Figure 6:
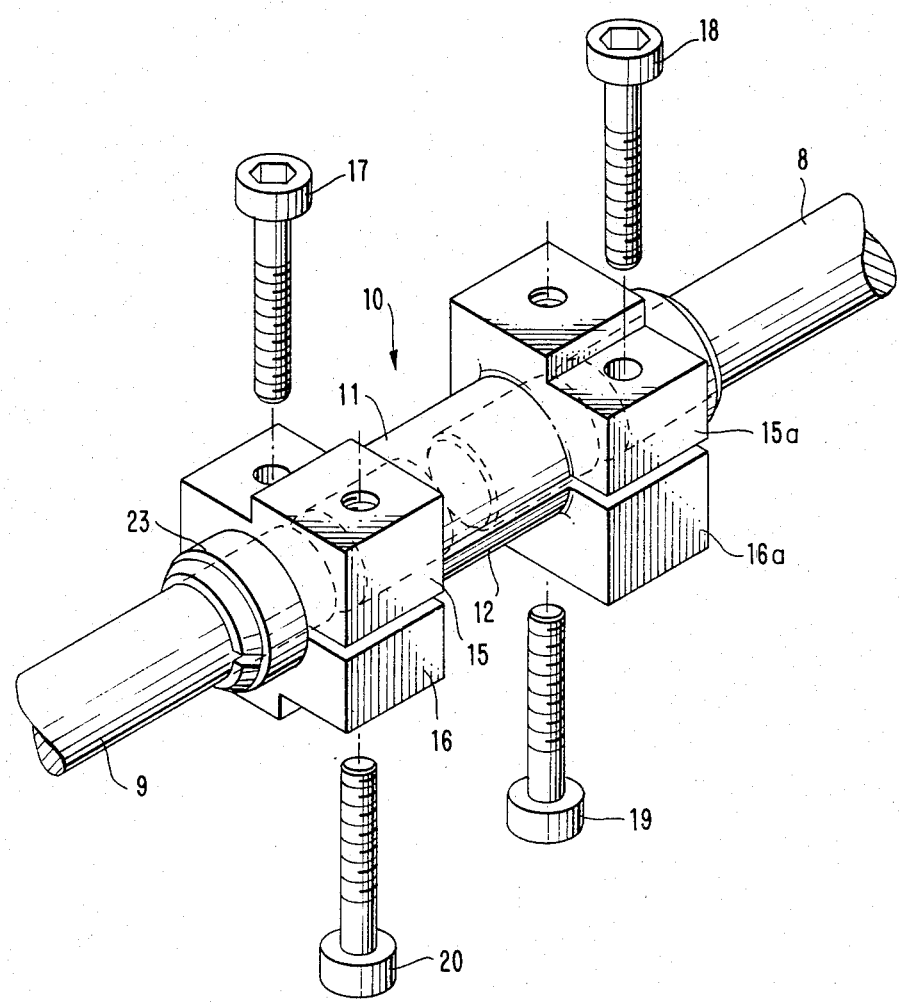
FIG. 6 is a perspective view of the coupling of the instant invention, prior to assembly, relative to the ends of two shaft portions.

In FIG. 6 the half-shells 11, 12 are shown loosely retained relative to one another by the rings (only ring 23 being shown). Bolts 17, 18, 19 and 20 are inserted in pairs in an opposed manner from opposite sides of the coupling. As is readily apparent in this figure, the half-shells 11, 12 are retained relative to one another while the ends of the shafts 8 and 9 are inserted therein facilitating insertion and tightening of the bolts. Clearly a coupling of the type disclosed herein may be utilized to advantage in confined areas where the assembly of loose or separate pieces would be difficult if not impossible.

While I have shown and described only one embodiment in accordance with the present invention, it is understood that the same is not limited thereto, but is susceptible of numerous changes and modifications as known to those skilled in the art, and I therefore do not wish to be limited to the details shown and described herein but intend to cover all such changes and modifications as are encompassed by the scope of the appended claims.

I claim:

1. A coupling for detachably connecting portions of a subdivided drive shaft operatively connecting a forwardly disposed drive unit with a rearwardly disposed transmission unit of a motor vehicle, the coupling comprising a plurality of shell means for connecting opposed ends of the portions of the subdivided drive shaft, means for fastening the plurality of shell means relative to one another when said coupling is in an assembled condition, and unitary ring means surrounding said plurality of shell means for maintaining the plurality of shell means relative to one another when said coupling is in a disassembled condition, said means for fastening engaging means associated with each of the opposed ends for preventing axial displacement of the opposed ends relative to one another and said opposed ends being drivingly connected with each other by said coupling within the area of the transmission unit when said coupling is in the assembled condition, said unitary ring means surrounding the shell means with a clearance when said coupling is in the assembled condition for enabling movement of the plurality of shell means relative to one another during disassembly and maintaining said plurality of shell means relative to one another when said coupling is in the disassembled condition, said plurality of shell means including means for positioning said unitary ring means relative thereto.

2. The coupling according to claim 1, wherein one of the plurality of shell means is securely connected by the means for positioning with the unitary ring means and the other of the plurality of shell means is movable with respect to the unitary ring means.

3. The coupling according to claim 1 or 2, wherein, respectively, a unitary ring means is arranged at each free end of the coupling and said means for positioning includes a recess means.

4. The coupling according to claim 1 or 2, wherein the means for positioning includes a center recess, said unitary ring means being securely connected with one of the plurality of shell means and surrounding the other of the plurality of shell means with said clearance.

* * * * *